(12) United States Patent
Lin et al.

(10) Patent No.: US 11,675,856 B2
(45) Date of Patent: Jun. 13, 2023

(54) PRODUCT FEATURES MAP

(71) Applicant: INTERNATIONAL BUSINESS MACHINES CORPORATION, Armonk, NY (US)

(72) Inventors: June-Ray Lin, Taipei (TW); Nan Chen, Beijing (CN); Ju Ling Liu, Beijing (CN); Li Na Wang, Beijing (CN); Shun Xian Wu, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 63 days.

(21) Appl. No.: 17/320,124

(22) Filed: May 13, 2021

(65) Prior Publication Data

US 2022/0365983 A1    Nov. 17, 2022

(51) Int. Cl.
*G06F 16/951* (2019.01)
*G06F 18/24* (2023.01)
*G06N 20/10* (2019.01)
*G06F 18/213* (2023.01)
*G06F 18/214* (2023.01)

(52) U.S. Cl.
CPC .......... *G06F 16/951* (2019.01); *G06F 18/213* (2023.01); *G06F 18/214* (2023.01); *G06F 18/24* (2023.01); *G06N 20/10* (2019.01)

(58) Field of Classification Search
CPC .... G06F 16/951; G06F 18/213; G06F 18/214; G06K 9/6232; G06K 9/6256
See application file for complete search history.

(56) References Cited

U.S. PATENT DOCUMENTS

| | | | |
|---|---|---|---|
| 7,478,053 B2 | 1/2009 | Dietz et al. | |
| 8,316,030 B2 | 11/2012 | Koperda et al. | |
| 9,372,919 B2 | 6/2016 | Chitiveli et al. | |
| 11,176,464 B1 * | 11/2021 | Sagi | G06N 7/01 |
| 11,373,117 B1 * | 6/2022 | Cui | G06F 16/285 |

(Continued)

FOREIGN PATENT DOCUMENTS

| | | |
|---|---|---|
| CN | 104063416 A | 9/2014 |
| JP | 5817491 B2 | 11/2015 |

OTHER PUBLICATIONS

Mell, P. et al., The NIST Definition of Cloud Computing, National Institute of Standards and Technology, U.S. Dept. of Commerce, Special Publication 800-145, Sep. 2011, 7 pg.

(Continued)

*Primary Examiner* — Dangelino N Gortayo
(74) *Attorney, Agent, or Firm* — Cuenot, Forsythe & Kim, LLC

(57) ABSTRACT

Content for products can be identified. For each identified content, at least one class to which the first content pertains can be predicted using an artificial intelligence multiclass model. For each identified first content that corresponds to the at least one class, a support level of the product with regard to at least one class can be predicted using artificial intelligence binary class models. For each identified product, data indicating the product and the support level of the product with regard to the at least one class can be added to a data table. A product features map based on the data indicating the products and a support level of each product with regard to the at least one class can be generated and output.

20 Claims, 9 Drawing Sheets

(56) References Cited

U.S. PATENT DOCUMENTS

| | | | |
|---|---|---|---|
| 11,392,651 B1* | 7/2022 | McClusky | G06F 40/284 |
| 2012/0209751 A1 | 8/2012 | Chen et al. | |
| 2013/0198183 A1 | 8/2013 | Clendinning et al. | |
| 2014/0304118 A1 | 10/2014 | Cho et al. | |
| 2015/0294353 A1 | 10/2015 | Schmeling et al. | |
| 2016/0042427 A1 | 2/2016 | Thakur et al. | |
| 2016/0055568 A1 | 2/2016 | Vidal et al. | |
| 2017/0091841 A1 | 3/2017 | Cunico et al. | |
| 2018/0150527 A1* | 5/2018 | Srivastava | G06Q 30/06 |
| 2019/0286734 A1 | 9/2019 | Kao et al. | |
| 2019/0340503 A1* | 11/2019 | Cheng | G06F 16/3332 |
| 2021/0149979 A1* | 5/2021 | Nagarjuna | G06F 16/36 |
| 2022/0107802 A1* | 4/2022 | Rao | G06F 16/907 |

OTHER PUBLICATIONS

"ECMAScript 6—New Features: Overview & Comparison,"[Online] Copyright © 2015-2017 Ralf S. Engelschall, [retrieved May 6, 2021], retrieved from the Internet: <http://es6-features.org/#Constants>, 1 pg.

"Support-vector machine," [online] from Wikipedia, the free encyclopedia, May 6, 2021, retrieved from the Internet: <https://en.wikipedia.org/w/index.php?title=Support-vector_machine&oldid=1021762947>, 20 pg.

"Watson Knowledge Studio—Overview," [online] IBM Corporation [retrieved Apr. 30, 2021], retrieved from the Internet <https://www.ibm.com/cloud/watson-knowledge-studio>, 9 pg.

"Watson Natural Language Classifier," [online] IBM Corporation [retrieved Apr. 6, 2021], retrieved from the Internet: <https://www.ibm.com/watson/services/natural-language-classifier/>, 15 pg.

* cited by examiner

500

```
┌─────────────────────────────────────────────────┐
│           Collect terms from websites           │
│                      505                        │
└─────────────────────────────────────────────────┘
                        │
                        ▼
┌─────────────────────────────────────────────────┐
│ Collect and tag content for use as training     │
│ material in training models for the             │
│ collected terms                                 │
│                      510                        │
└─────────────────────────────────────────────────┘
                        │
                        ▼
┌─────────────────────────────────────────────────┐
│ Train an AI multiclass model to predict classes │
│ to which terms belong                           │
│                      515                        │
└─────────────────────────────────────────────────┘
                        │
                        ▼
┌─────────────────────────────────────────────────┐
│ Train AI binary class models to predict support │
│ levels for terms                                │
│                      520                        │
└─────────────────────────────────────────────────┘
```

```
Identify content for products
805
```
↓
```
For each identified content, predict at least one class to which the content
pertains using an AI multiclass model
810
```
↓
```
For each identified content that corresponds to the at least one class, predict a
support level of the product with regard to at least one class using AI binary class
models
815
```
↓
```
For each identified product, add to a data table data indicating the product and a
support level of the product with regard to the at least one class
820
```
↓
```
Generate and output a product features map based on the data indicating the
products and a support level of each product with regard to the at least one class
825
```

FIG. 8

PRODUCT FEATURES MAP

BACKGROUND

The present invention relates to data processing systems and, more particularly, to artificial intelligence.

It is not uncommon for technical literature, for example specification sheets for technical products, to make use of scientific and technical terms. The language of science and technology continues to grow in breadth and depth as scientific and technological disciplines continue to advance, however. Indeed, new scientific and technological terms continually are being developed.

SUMMARY

A method includes identifying first content for products. The method also can include, for each identified first content, predicting, using a processor, at least one class to which the first content pertains using an artificial intelligence multiclass model. The method also can include, for each identified first content that corresponds to the at least one class, predicting a support level of the product with regard to at least one class using artificial intelligence binary class models. The method also can include, for each identified product, adding to a data table data indicating the product and the support level of the product with regard to the at least one class. The method also can include generating and outputting a product features map based on the data indicating the products and a support level of each product with regard to the at least one class.

A system includes a processor programmed to initiate executable operations. The executable operations include identifying first content for products. The executable operations also can include, for each identified first content, predicting at least one class to which the first content pertains using an artificial intelligence multiclass model. The executable operations also can include, for each identified first content that corresponds to the at least one class, predicting a support level of the product with regard to at least one class using artificial intelligence binary class models. The executable operations also can include, for each identified product, adding to a data table data indicating the product and the support level of the product with regard to the at least one class. The executable operations also can include generating and outputting a product features map based on the data indicating the products and a support level of each product with regard to the at least one class.

A computer program product includes a computer readable storage medium having program code stored thereon. The program code is executable by a data processing system to initiate operations. The operations include identifying first content for products. The operations also can include, for each identified first content, predicting at least one class to which the first content pertains using an artificial intelligence multiclass model. The operations also can include, for each identified first content that corresponds to the at least one class, predicting a support level of the product with regard to at least one class using artificial intelligence binary class models. The operations also can include, for each identified product, adding to a data table data indicating the product and the support level of the product with regard to the at least one class. The operations also can include generating and outputting a product features map based on the data indicating the products and a support level of each product with regard to the at least one class.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

FIG. 5 is a flowchart illustrating an example of a method of training a multiclass model and binary class models.

FIG. 8 is a flowchart illustrating an example of a method of generating a data structure comprising support levels term.

DETAILED DESCRIPTION

Figure 1:
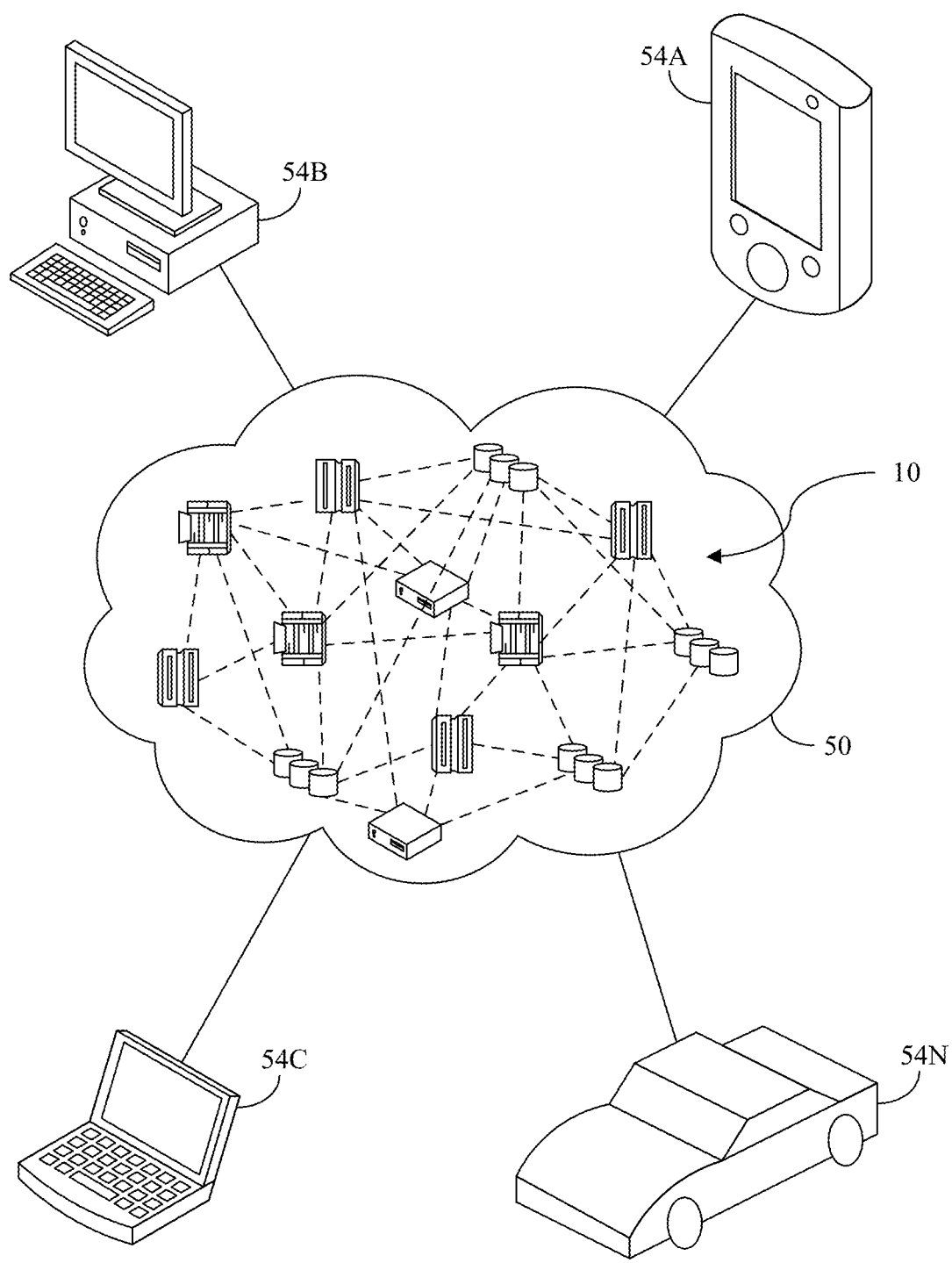
FIG. 1 depicts a cloud computing environment according to an embodiment of the present invention.

The arrangements described herein are directed to computer technology and provide an improvement to computer technology. Specifically, the present arrangements improve the efficiency of performing computer operations to determine correlations among terms contained various in various content. For example, determinations can be made as to correlations among terms indicating product types, terms indicating software tools, and terms indicating support levels for various software tools.

For example, assume it is desired to automatically find and compare software development products that include various tools and support levels for those tools. Different products may include different tools (e.g., modules, such as software modules, that are configurable to be implemented in a variety of products), and different products that provide a same tool may provide different support levels for that tool (e.g., security protocols, administration features, collaboration features, analytics features, etc.). Although product description documents may be available via the Internet, product description documents typically provide only a high-level view of products and lack a complete listing of available software tools and support levels. Indeed, it is common for products to lack a single document describing all of their included tools and support levels for those tools. Such information may be scattered across multiple documents on various websites. The arrangements described herein automate the process of finding detailed information for items of interest, where the detailed information may be scattered among various content dispersed among various websites. For example, these arrangements can be implemented to collect and compare data pertaining to a plurality of products.

For each content that is found, artificial intelligence (AI) binary class models could be utilized to determine to which product each content pertains, which tools are discussed in the content, and which support levels are discussed. Such implementation would use at least one binary class model for each term that relates to a field of technology, a tool, or a support level that potentially may be utilized for a tool. Thus, if binary class models are used exclusively to determine such correlations on a large quantity of content, the number (N) of binary class models that would be used would as follows: N=D×T×S, where C is the number of content, T is the number of tools, and S is the number of available support levels. Assume, for example, 500 documents are found, there are 80 different tools utilized in that field of technology, and for each tool there are tens, if not hundreds, of different support levels. For simplicity, in this example assume the average number of support levels is 30. The number of binary class model instances that would be implemented to determine which products have which tools and have which support levels for those tools would be 500×80×30=1,200,000. Moreover, for some terms there could be multiple binary class models, thus the number of binary class model instances could be even greater.

Various arrangements described herein significantly increase the performance of a computer to perform data collection and comparison operations by reducing the number of operations need be executed to perform the data gathering and compression. This greatly increases the speed at which the computer is able to complete the operations and significantly decreases the use of the computer's processing resources. Specifically, the present arrangements implement an AI multiclass model that is able to predict terms to which content is related, and determine whether any such terms match a desired class (e.g., determine if content is directed to a particular technology of interest). Responsive to the multiclass model performing such predictions and determinations, content that include terms that match the desired class can be selected, and binary class models can be implemented on the selected content, as opposed to being performed on all of the content if binary class models are exclusively used.

This can significantly reduce the number of binary class model instances implemented to determine the support levels. Continuing with the previous example, assume 500 documents are found, but 80 documents are selected. Also assume that, on average, there are 5 tools discussed in each document, and on average there are 30 support levels for each tool. The total number of binary class model instances would be 80×5×30=12,000. There also would be 500 multiclass model instances, giving a total number of AI model instances of 12,500. This represents greater than a 99.99% reduction in the number of AI model instances being implemented as compared to exclusively using binary class models, thus significantly reducing usage of computer resources and greatly improving the speed at which the data and comparison operations are completed.

Several definitions that apply throughout this document now will be presented.

As defined herein, the term "support level" means an indication of how complete an implementation of a technology is in compliance with a specification defined for the technology. For example, if a software tool has a total of one hundred available features, a first software product that includes, or otherwise uses, that tool implements each of those features, the first software product can be determined to have a support level of 1 for that tool. On the other hand, if a second software product only implements fifty of those features, the second software product can be determined to have a support level of 0.5 for that tool. In this regard, a support level can be a value in a range of 0 to 1, or scaled to be a percentage from 0% to 100%.

As defined herein, the term "tool" means a module configurable in be implemented in a variety of products.

As defined herein, the term "artificial intelligence model" means a functional data structure that replicates a decision process to enable automation and computer understanding, and that is trained using existing data to make predictions on new data.

As defined herein, the term "multiclass model" means an artificial intelligence model configured to predict three or more classes.

As defined herein, the term "binary class model" means an artificial intelligence model configured to predict a state from among two, and only two, known states.

As defined herein, the term "support-vector machine" means a supervised learning model associated with a learning algorithm that analyzes data for classification and regression analysis with the following characteristics: given a set of training examples, each marked as belonging to one of two categories, a support-vector machine training algorithm builds a model that assigns new examples to one category or the other, making it a non-probabilistic binary linear classifier; and the support-vector machine maps training examples to points in space so as to maximize the width of the gap between the two categories. New examples are then mapped into that same space and predicted to belong to a category based on which side of the gap they fall.

As defined herein, the term "content" means content provided by a website. Examples of content include information presented on web pages, documents, and audio and/or video content.

As defined herein, the term "web crawler" means an internet bot that systematically browses the World Wide Web.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "data processing system" means one or more hardware systems configured to process data, each hardware system including at least one processor programmed to initiate executable operations and memory.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "server" means a data processing system configured to share services with one or more other data processing systems.

As defined herein, the term "real time" means a level of processing responsiveness that a user or system senses as sufficiently immediate for a particular process or determination to be made, or that enables the processor to keep up with some external process.

As defined herein, the term "output" means storing in memory elements, writing to display or other peripheral output device, sending or transmitting to another system, exporting, or similar operations.

As defined herein, the term "automatically" means without user intervention.

As defined herein, the term "user" means a person (i.e., a human being).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
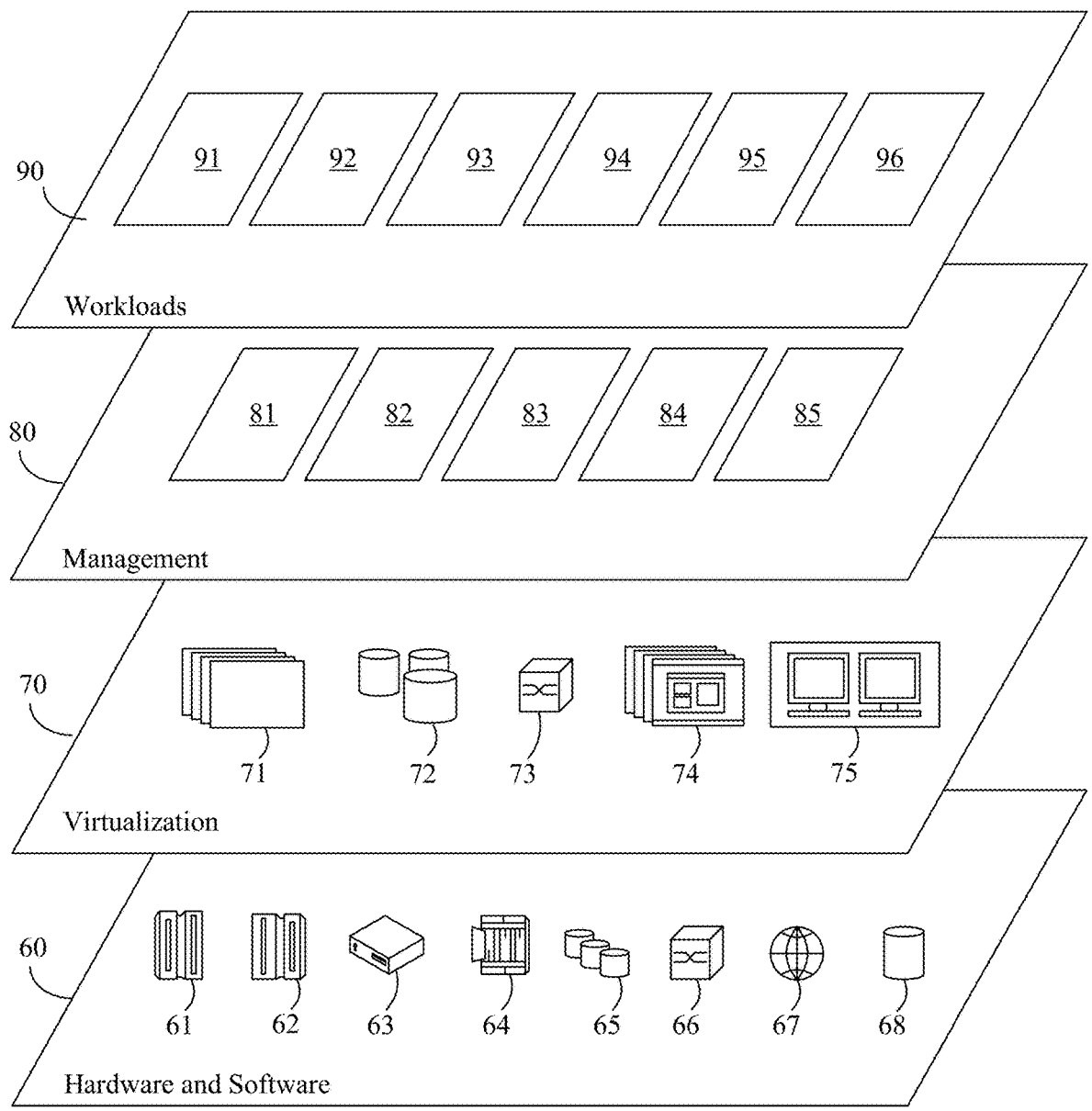
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In an example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; data analytics processing 93; transaction processing 94; artificial intelligence 95; and web hosting 96.

Figure 3:
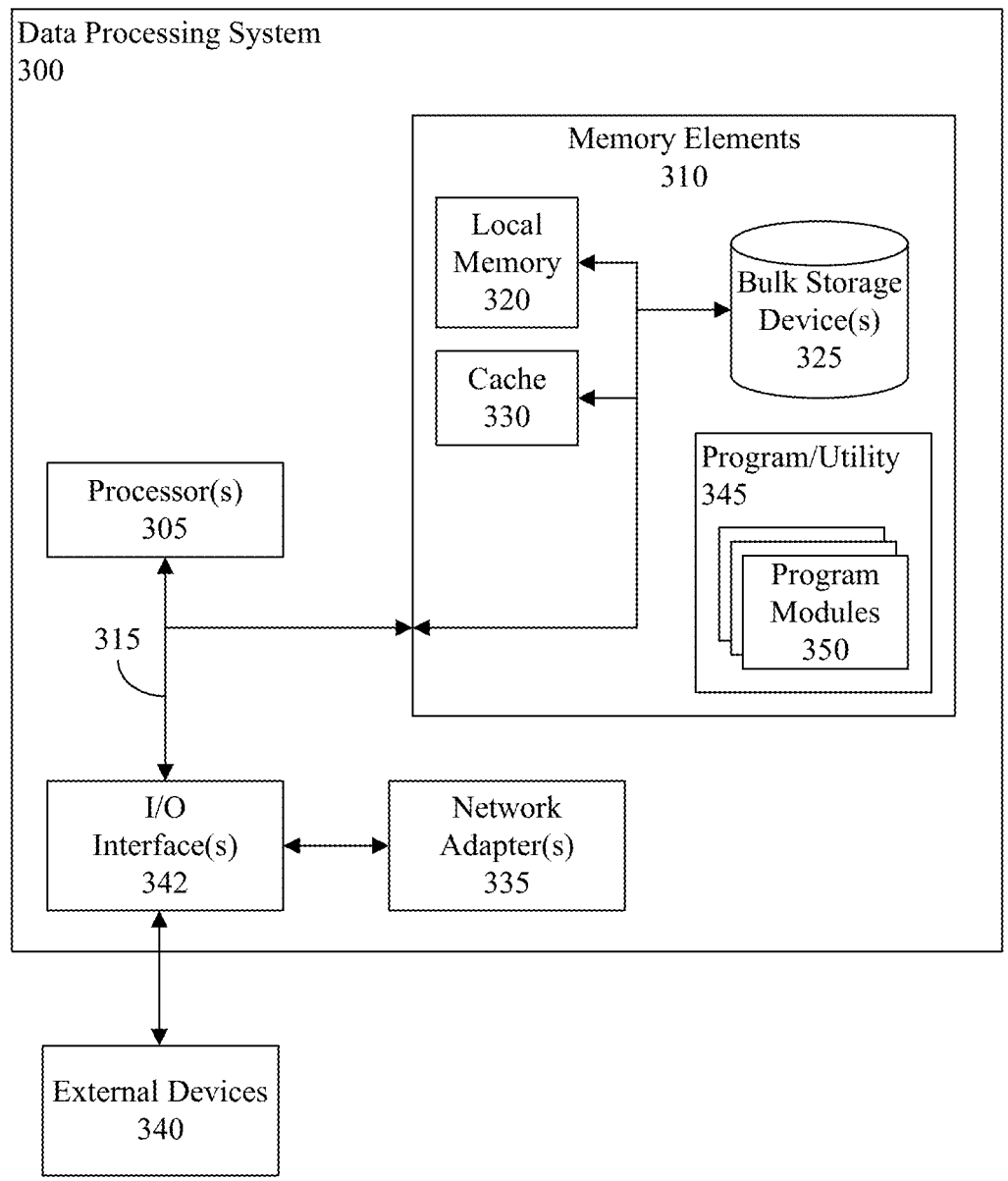
FIG. 3 is a block diagram illustrating example architecture for a data processing system.

FIG. 3 is a block diagram illustrating example architecture for a data processing system 300, which can be implemented as a node of the cloud computing environment 50 (FIG. 1). The data processing system 300 can include at least one processor 305 (e.g., a central processing unit) coupled to memory elements 310 through a system bus 315 or other suitable circuitry. As such, the data processing system 300 can store program code within the memory elements 310. The processor 305 can execute the program code accessed from the memory elements 310 via the system bus 315. It should be appreciated that the data processing system 300 can be implemented in the form of any system including a processor and memory that is capable of performing the functions and/or operations described within this specification. For example, the data processing system 300 can be implemented as a server, a plurality of communicatively linked servers, a workstation, a desktop computer, a mobile computer, a tablet computer, a laptop computer, a netbook computer, a smart phone, a personal digital assistant, a set-top box, a network appliance, and so on.

The memory elements 310 can include one or more physical memory devices such as, for example, local memory 320 and one or more bulk storage devices 325. Local memory 320 refers to random access memory (RAM) or other non-persistent memory device(s) generally used during actual execution of the program code. The bulk storage device(s) 325 can be implemented as a hard disk drive (HDD), solid state drive (SSD), or other persistent data storage device. The data processing system 300 also can include one or more cache memories 330 that provide temporary storage of at least some program code in order to reduce the number of times program code must be retrieved from the local memory 320 and/or bulk storage device 325 during execution.

Input/output (I/O) devices such as one or more network adapters 335 and various external devices 340 (e.g., a display, a touch screen, a pointing device, a keyboard, etc.) can be coupled to the data processing system 300. The I/O devices can be coupled to the data processing system 300 either directly or through intervening I/O interfaces 342. The network adapters 335 can enable the data processing system 300 to become coupled to other systems, computer systems, remote printers, and/or remote storage devices through intervening private or public networks. Modems, cable modems, transceivers, and Ethernet cards are examples of different types of network adapters 335 that can be used with the data processing system 300.

As pictured in FIG. 3, the memory elements 310 can store at least one program/utility 345, including one or more program modules 350, configured to perform processes described herein. Being implemented in the form of executable program code, the program/utility 345 can be executed by the data processing system 300 (e.g., by the processor 305) and, as such, can be considered part of the data processing system 300. Moreover, the program/utility 345 is a functional data structures that imparts functionality when employed as part of the data processing system 300. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Date generated by the program/utility 345 can be output to, and stored within, the memory elements 310. As used herein, "outputting" and/or "output" can mean storing in the memory elements 310, for example, writing to a file stored in the memory elements 310, writing to a display or other peripheral output device, sending or transmitting to another system, exporting, or similar operations.

Figure 4:
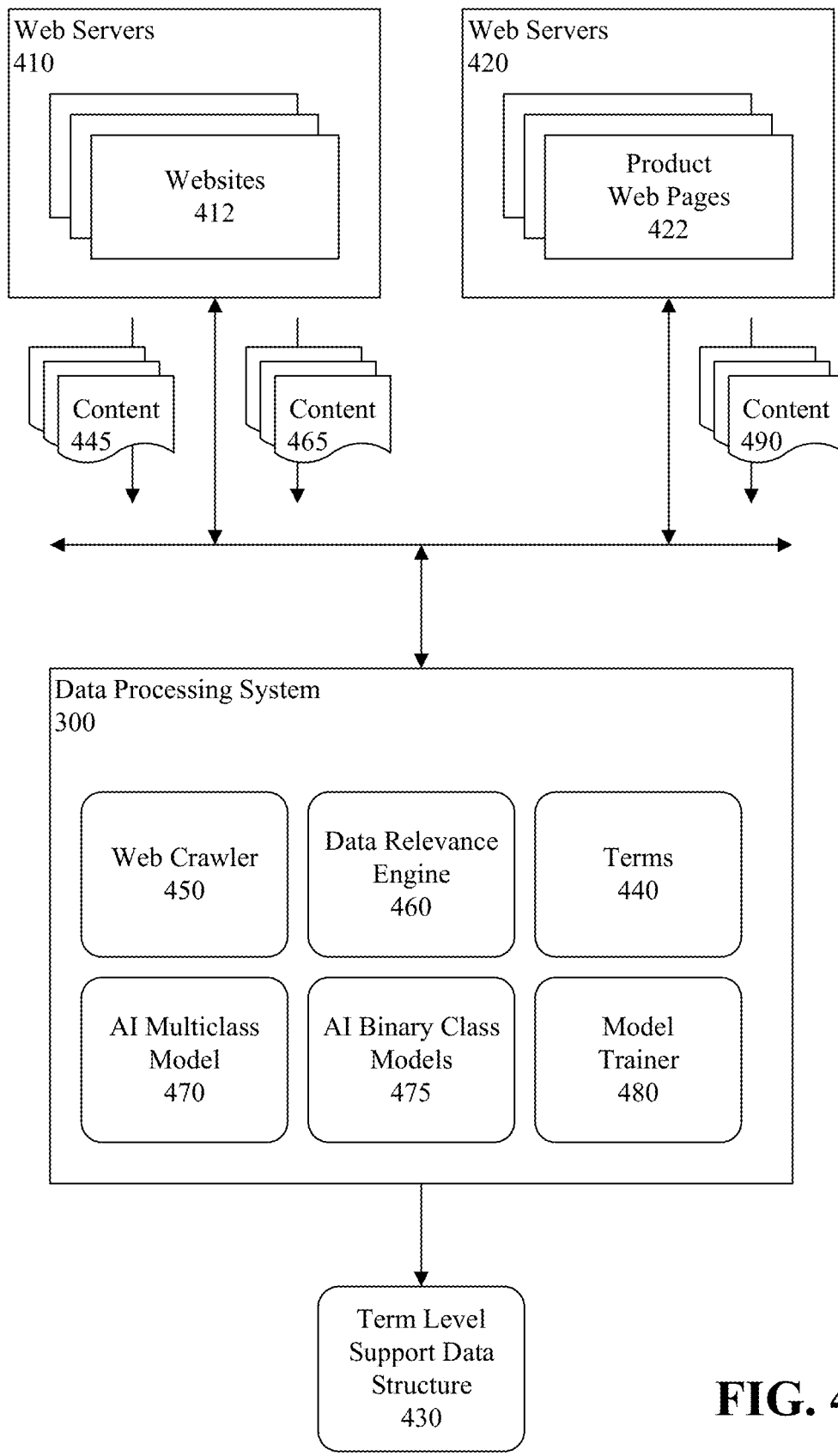
FIG. 4 is a block diagram of various nodes of the cloud computing environment of FIG. 1.

FIG. 4 is a block diagram of various nodes 10 of the cloud computing environment 50 of FIG. 1 useful for understanding the present arrangements. The nodes 10 can include the data processing system 300 of FIG. 3, servers 410 hosting websites 412 (e.g., professional websites) and servers 420 hosting product web pages 422. The servers 410, 420 can be implemented in the hardware and software layer 60 (FIG. 2) of the cloud computing environment 50 (FIG. 1). The websites 412 and product web pages 422 can be components of the workloads layer 90 of the cloud computing environment 50.

FIG. 5 is a flowchart illustrating an example of a method 500 of training an AI multiclass model (hereinafter "multiclass model") 470 and AI binary class models (hereinafter "binary class models") 475. For ease of understanding, in the following description of the method 500 reference now will be made both to FIGS. 4 and 5.

At step 505 the data processing system (hereinafter "system") 300 can collect terms 440 (e.g., technical terms) from websites 412. In illustration, the system 300 can include a web crawler 450 configured to automatically search the Internet for content 445 and download and index the content 445 from websites 412, for example in real time.

A user can enter into the data processing system 300 a term 440, such as a term pertaining to a particular technology. For example, the term can indicate a type of product or a software tool. The web crawler 450 can identify websites that pertain to the term 440 and download content 445 from those websites. In one or more arrangements, the web crawler 450 can ignore certain types of content 445, for example index pages for websites 412. In one or more arrangements, the web crawler 450 can be configured to identify websites 412 that are websites for professional organizations. In illustration, the web crawler 450 can identify websites 412 for organizations that create technical standards, websites 412 for organizations that provide software tools (e.g., software applications incorporated into numerous other software applications), websites 412 for organizations that provide journals, symposiums, reviews, etc., and so on.

As the web crawler 450 accesses each website 412, the web crawler 450 can determine whether the website 412 contains the specified term 440, for example within content provided by the website, metadata of the website, etc. The web crawler 450 can download content 445 from those websites 412. For example, the web crawler 450 can be configured to identify topics of web pages and download content from those web pages having a topic matching the specified term 440. The web crawler 450 can identify web page topics by analyzing web page metadata, analyzing titles presented on web pages, analyzing one or more initial paragraphs of text presented on web pages, etc.

In one or more arrangements, a threshold number (e.g., a value such as 1,000) of content 445 can be specified, for example by a user. The web crawler 450 can continue accessing websites and downloading content 445 from websites identified as professional websites 412 until at least the threshold number of content 445 has been downloaded.

The system 300 also can include a data relevance engine 460 configured to analyze the downloaded content 445 and identify terms 440 contained in the content 445, for example technical terms. In one or more arrangements, the data relevance engine 460 can ignore certain types of content 445, for example index pages for websites 412 if the web crawler 450 was not configured to ignore index pages. Some content 445 may be text, but some content 445 may not be text. The data relevance engine 460 can include, or otherwise access, one or more applications configured to convert content 445 to text, or otherwise identify text in content 445. Examples of such applications include, but are not limited to, applications that perform optical character recognition (OCR) and applications that perform speech recognition.

The data relevance engine 460 can analyze the of text in, or converted from, the content 445 to determine which text contains certain types of terms, for example technical terms. In illustration, the data relevance engine 445 also can include, or otherwise access and use, an artificial intelligence (AI) system that recognizes and trends terms contained in the content 445. An example of a suitable AI system which the data relevance engine 445 can access and use is IBM Watson® Knowledge Studio. In illustration, the data relevance engine 445 can communicate the downloaded content 445, as well as derived audio and/or video using OCR and/or speech recognition, to IBM Watson® Knowledge Studio. IBM Watson® Knowledge Studio can process the content 445 to automatically identify terms relevant technology. In the following description it will be assumed that the data relevance engine 460 includes an AI system, but those skilled in the art will appreciate that the data relevance engine 460 can access and use an external AI system to perform processes described herein related to identifying terms.

To identify terms relevant to the term 440 used to search for the content, the data relevance engine 460 can use pre-annotation to automatically annotate terms contained in the downloaded content 445 using one or more dictionaries of terms (e.g., industry-specific terms) and/or natural language processing (NLP). Based on the pre-annotation, the data relevance engine 460 can identify terms that are relevant to the term 440. Some terms that are relevant, however, may not be identified if they are not contained in the dictionaries used. Using NLP, the data relevance engine 460 can determine relationships between the other terms in the content 445 and annotated terms. Based on the determined relationships, the relevance engine 460 can identify other terms that are relevant to the term 440.

The data relevance engine 460 can create or otherwise access a data table for terms 440. In that data table the data relevance engine 460 can store each term that was identified, including the annotated terms and other identified terms, as terms 440. In one or more arrangements, the data relevance engine 460 can limit the number of terms stored as terms 440 to a threshold value, for instance a user defined threshold value (e.g., 1,000). For example, based on results of the NPL performed on the downloaded content 445, the data relevance engine 460 can determine which terms are most relevant to the and store threshold number of terms which are most relevant. By way of example, the data relevance engine 460 can assign a relevancy score to each term, and select terms having the highest relevancy score.

At step 510 the system 300 can collect and tag content 465 for use as training material in training AI models for the collected terms 440. Such AI models can include a multiclass model 470 and a plurality of binary class models 475 for a particular type of content to be searched and analyzed (e.g., to find and compare products in a particular field of technology). Additional multiclass models 470 and binary class models 475 can be implemented for other types of content.

To collect the content 465, the web crawler 450 can search the Internet and identify websites containing content 465 including one or more of the terms 440. In one or more arrangements, the web crawler 450 can ignore certain types of content 465, for example index pages for websites 412. The web crawler 450 can download such content 465. In one or more arrangements, the web crawler 450 can download only content 465 that includes at least a threshold number of the terms 440 (e.g., a value such as 5). The threshold number of terms can be user defined. Further, in one or more arrangements, the web crawler 550 can stop searching for and downloading content 465 responsive to a threshold number of downloaded content 465 having been reached. Again, the threshold number of content 465 to be downloaded can be user defined.

The data relevance engine 460 can search the downloaded content 465 for the terms 440 and add to each content 465 a tag indicating which terms 440 are contained in that content 465. Further, the data relevance engine 460 can add to each content 465 a tag indicating the number (e.g., quantity) of terms 440 found in that content 465.

At step 515 the system 300 can train a multiclass model 470 to predict classes (e.g., a categories) to which terms 440 belong using the downloaded content 465. In one or more arrangements, training of the multiclass model can be performed by a model trainer 480 (FIG. 4) using machine learning. In another example, in one or more arrangements training of the multiclass model 470 can be performed by another system, for example an AI system such as IBM Watson® Knowledge Studio, to which the system 300 is communicatively linked. In the following description it will be assumed that the model trainer 480 performs the training of the multiclass model 470, but those skilled in the art will appreciate that the model trainer 480 can access and use the external AI system to perform processes described herein related to training models.

Figure 6:
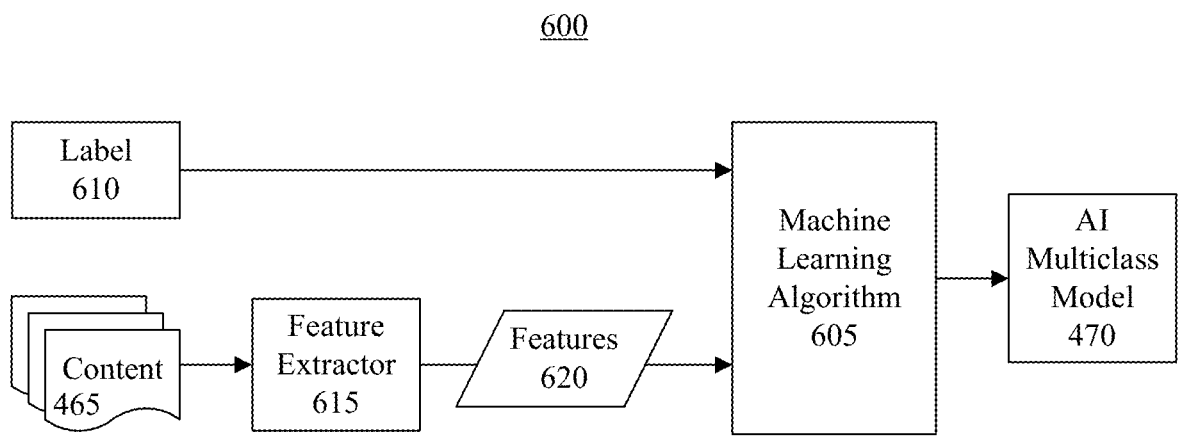
FIG. 6 depicts a flow diagram illustrating an example of training of a multiclass model.

FIG. 6 depicts a flow diagram 600 illustrating an example of training of the multiclass model 470. In this example, the process represented by the flow diagram 600 is implemented to train the multiclass model 470 on a particular term 440. The process can repeat for additional terms 440 to further train the multiclass model 470 on those terms 440. For example, the process can repeat sequentially and/or run in parallel for each term 440 until the multiclass model 470 has been trained for all of the terms 440 identified from the content 445 and stored to a data table.

The model trainer 480 can specify a quantity of the content 465 to be used for training the multiclass model 470 for each term 440. For example, the user can specify that 200 content 465 is to be used for each term 440. The model trainer 480 can, for each term 440, randomly select from the content 465 a portion of the content 465 at least equaling that the specified quantity. In one or more arrangements, the model trainer 480 can ignore certain types of content 465, for example index pages for websites 412 if the web crawler 450 was not configured to ignore index pages.

In contrast to training of the binary class models 475, which will be described, training of the multiclass model 470 can include newly selecting a portion of content 465 for each of the terms 440. Thus, the total number of content 465 used for training of the multiclass model 470 can be as high as M×N, where M is the number of terms 440 being analyzed and N is the number of content 465 used for each term 440 for training the multiclass model 470.

For a particular term 440 and a particular content 465, the model trainer 480 can communicate to a machine learning algorithm 605 a label 610 indicating whether that content 465 is positive content or negative content. The term "positive content" means content that includes that particular term 440. The term "negative content" means content that does not include that particular term 440. In this regard, responsive to selecting the particular content 465, the model trainer 480 can analyze that particular content 465 to determine whether that particular content 465 includes the particular term 440.

Further, the model trainer 480 can, for that content 465, implement a feature extractor 615, which is known in the art, to extract features 620 from the content 465 and communicate those features 620 to the machine learning algorithm 605. The machine learning algorithm 605 can update the multiclass model 470 for the subject term to indicate that those the features 620 that are relevant to the term 440, if any. If the multiclass model 470 does not already exist, for example when the first term 440 and first content 465 are processed, the machine learning algorithm 605 can create the multiclass model 470 from a multiclass model template. The process can repeat for additional content 465 that is selected for the term 440 to further update the multiclass model 470 using that content 465 for that term 440. For example, the process can repeat sequentially and/or run in parallel for each content 465 until the multiclass model 470 has been updated using each of the selected content 645 for the particular term 440 presently being analyzed.

Further, the machine learning algorithm 605 can implement support vector machines (SVMs) to determine trending data pertaining to usage of terms 440 among the content 465. The machine learning algorithm 605 can determine classes for terms 440 based on the trending data. Terms in 440 may not be mutually exclusive, but they can be different in some way according to the content 465 that define the terms 440. Content defining each term can be labeled using terms 440 contained in the content 465. For n terms, every term 440 contained in a content 465 that is extracted as a feature 605 can be communicated to the machine learning algorithm 605. The machine learning algorithm 605 can generate $n*((n-1)/2)$ SVMs, comparing each term 440 to each of the other terms 440. These can be known as one-vs-one classifiers. The multiclass model 570 can include each of the one-vs-one classifiers. The machine learning algorithm 605 also can add to the multiclass model 470 an index class. The index class can be used to predict whether other content is a summary or index and skip binary prediction on such content.

Referring again to FIG. 5, at step 520 the system 300 can train binary class models 475 to predict support levels for terms 440. In one or more arrangements, training of the binary class models 475 can be performed by the model trainer 480 (FIG. 4) using machine learning. In another example, in one or more arrangements training of the binary class models 475 can be performed by another system, for example an AI system such as IBM Watson® Knowledge Studio, to which the system 300 is communicatively linked. In the following description it will be assumed that the model trainer 480 performs the training of the binary class models 475, but those skilled in the art will appreciate that the model trainer 480 can access and use the external AI system to perform processes described herein related to training models.

Figure 7:
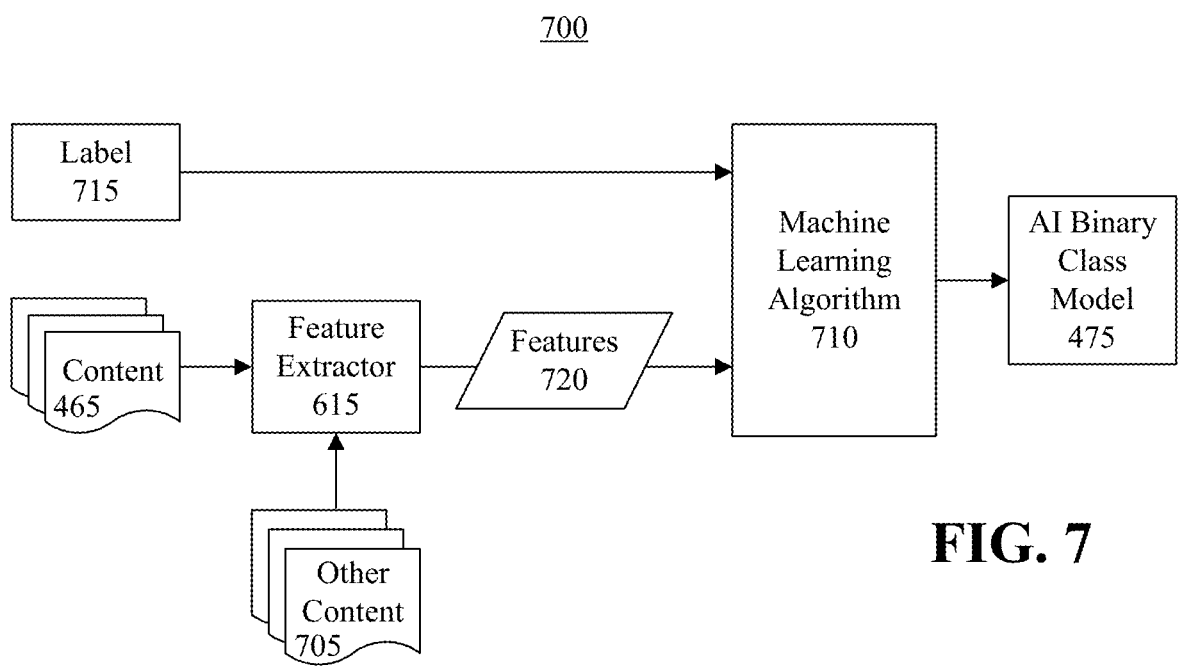
FIG. 7 depicts a flow diagram illustrating an example of training of a binary class model.

FIG. 7 depicts a flow diagram 700 illustrating an example of training of the binary class model 475. In this example, the process represented by the flow diagram 700 is implemented to train a binary class model 475 for a particular term 440. The process can repeat for additional terms 440 to train additional binary class models 475 for those terms 440. For example, the process can repeat sequentially and/or run in parallel for each term 440 until a binary class models 475 has been trained for each of the terms 440 identified from the content 445 and stored to a data table. In this regard, there can be one binary class model 475 generated for each term 440 contained in the content 465. Each binary class model 475 can be generated using a one-vs-rest classification, for example as previously described for SVMs.

For training the binary class models 475, the model trainer 480 can select at least a portion of the content 465 that includes at least one of the terms 440, and thus referred to as "positive content," and select other content 705 that does not include any of the terms 440, and thus referred to as "negative content." The other content 705 can be randomly downloaded, for example via the Internet and/or accessed from a content repository. The model trainer 480 can analyze each downloaded, or otherwise accessed, content to determine whether the content includes any of the terms 440. If so, the model trainer 480 can ignore such content. If the downloaded, or otherwise accessed, content does not include any of the terms 440, the model trainer 480 can use that content as other content 705. In one or more arrangements, the model trainer 480 can ignore certain types of content, for example index pages for websites if the web crawler 450 was not configured to ignore index pages. A user can specify a quantity (e.g., a value such as 500) of the positive content and a quantity (e.g., a value such as 500) of the negative content to be selected for the binary class model 475 training process, for example.

In contrast to training of the Multiclass model 470 previously described, for training of the binary class models 475 a defined quantity of content 465 and a defined quantity of other content 705 can be used to train the binary class models 475. Thus, the total number of content used for training the binary class models 475 can be P+Q, where P is the quantity of content 465 selected and Q is the quantity of other content 705 selected.

For a particular term 440 and a particular content 465, 705, the model trainer 480 can communicate to a machine learning algorithm 710 a label 715 indicating whether the selected content 465, 705 is positive content (i.e., content 465) or negative content (i.e., other content 705). Further, the model trainer 480 can, for that content 465, 705, implement the feature extractor 615 to extract features 720 from the particular content 465, 705 and communicate those features 720 to the machine learning algorithm 710. The machine learning algorithm 710 can update the binary class model 475 for the subject term to indicate that those the features 720 that are relevant to the term 440, if any. If the binary class model 475 does not already exist, for example when initially crating the binary class model 475 for the term 440, the machine learning algorithm 710 can create the binary class model 475 from a binary class model template. The process can repeat for each of the remaining content 465, 705 that is selected to further update the binary class model 475 for that term 440. For example, the process can repeat sequentially and/or run in parallel for each content 465, 705 until the binary class model 475 has been updated using each of the selected content 465, 705.

Further, the machine learning algorithm 710 can implement a SVMs to determine trending data indicating relationships, in the content 465, between the features 620 and terms 440 upon which classes are based. In illustration, the machine learning algorithm 710 can, for each term 440 upon which a class is based, determine features 720 that typically are contained in positive content 465 that contains that term 440, but not contained in negative content. In this regard, the trending data can use the negative content to selectively filter out features that are generic. The machine learning algorithm 710 can assign those features 620 to that class. Whether a feature 720 typically is contained in content 465 that include a particular term 440 upon which a class is based can be determined based on a threshold value. The threshold value can be defined, for example by a user. In illustration, assume the threshold value is set to 90%, or 0.9. If at least 90% of the content 465 in which a particular feature 720 is contained include a particular term 440 upon which a class is based, then that feature 720 can be assigned to that class. Accordingly, the classes can be used to predict which features of other content are pertinent to particular terms, as will be described.

At this point it should be noted that the processes described for the method 500 can be re-implemented from time-to-time to update the multiclass model 470 and add additional binary class models 475. Accordingly, the multiclass model 470 and binary class models 475 can be kept current so as to properly identify new terms created for the field (e.g., are of technology) for which the models 470, 475 are adapted.

Figure 9:
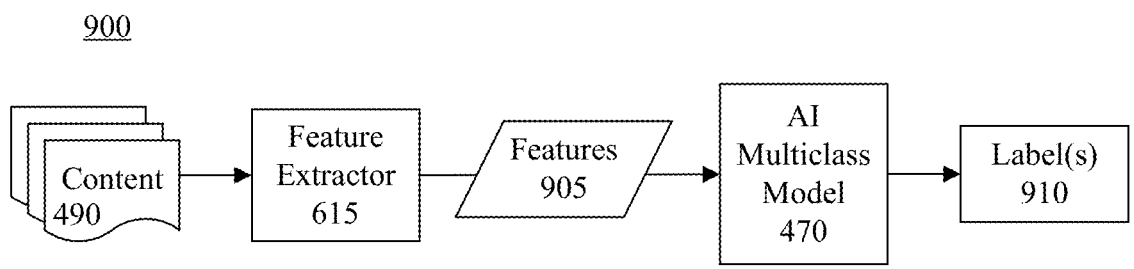
FIG. 9 depicts a flow diagram illustrating an example of predicting at least one class contained in content using a multiclass model.
Figure 10:
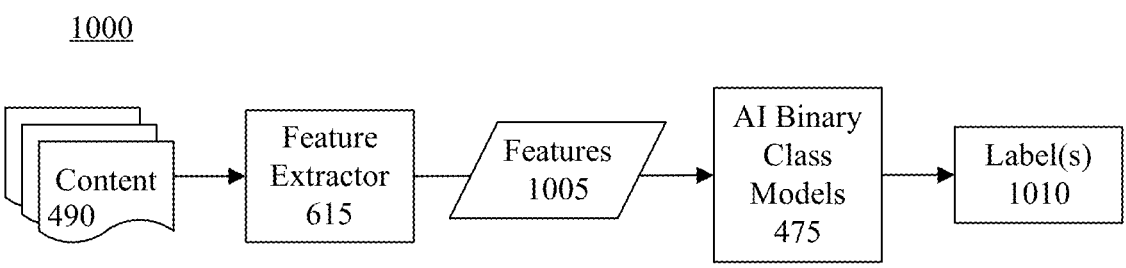
FIG. 10 depicts a flow diagram illustrating an example of predicting a support level for a at least one class using a binary class model.

FIG. 8 is a flowchart illustrating an example of a method 800 of generating a data structure for predicting support levels for terms. FIG. 9 depicts a flow diagram 900 illustrating an example of predicting at least one class contained in content 490 using a multiclass model 470. FIG. 10 depicts a flow diagram 1000 illustrating an example of predicting a support level for a class using a binary class model 475. For ease of understanding, in the following description of the method 500 reference now will be made both to FIGS. 8, 9 and 10.

At step 805 the system 300 can identify content for products. In illustration, the system 300 can receive one or more user inputs indicating web pages for products of interest to the user. In response, for each product, the web crawler 450 can access and download content 490 (FIG. 4) the web page. Further, for each product, the web crawler 450 can automatically search the Internet for additional web sites comprising content 490 pertaining to that product and download that content. For each product, the web crawler 450 can download at least a threshold number of content. The threshold number of content can be user defined.

At step 810, the data relevance engine 160 can, for each identified content, predict at least one class to which the content 490 pertains using the multiclass model 470. For example, referring to FIG. 9, the data relevance engine 160 can use the feature extractor 615 to extract features 905 from the content 490 and apply the multiclass model 470 to the features to determine whether at least one of those features 905 corresponds to one or more terms included in the index class of the multiclass model 470. The data relevance engine 160 can ignore content 490 that does not correspond to at one of the classes specified in the multiclass model 170. If the content 490 includes at least one feature 905 corresponding to one or more terms included in the index class of the multiclass model 470, the data relevance engine 160 can identify the class(es) to which the feature(s) correspond(s) and output one more labels 910 indicating that class (or those classes). Step 810 can repeat sequentially and/or run in parallel for each identified content for a particular product.

At step 815, the data relevance engine 160 can, for each identified content 490 that corresponds to the at least one class specified in the multiclass model 470, predict a support level of the product with regard to at least one class (e.g., features of the identified class(es)) using the binary class models 475). For example, referring to FIG. 10, the data relevance engine 160 can use the feature extractor 615 to extract features 1005 (or simply use the features 905 already extracted) from the content 490. The data relevance engine 160 can apply a binary class model 475 to each feature 1005 to determine whether, in the present content 490, the feature 1005 correlates to a term in the content 490 corresponding to a class identified for the content 490. For the present content 490, the data relevance engine 160 can process each feature 1005 in this manner to determine, for each identified class, the features 1005 that are supported in the content 490. The data relevance engine 160 can generate a label 1010 for each identified class indicating which features of the class are supported in the content 490.

For a particular product, based on the features found to be supported for each class among all of the content 490 accessed for that product, the data relevance engine 160 can predict a support level for that class. The number of features for each term can be, by default all other terms (e.g., words)

used in the content 490 describing the term. By vectorizing the other terms, SVMs can be used as classifiers. Feature selection techniques can be used to remove less-important other terms (e.g. stop words such "the," "a," "an," "in," etc.) from the binary class models 475. The binary class models 475 can map the input space into high-dimensional feature space, creating a linear or non-linear function predicting the term. Different features (e.g., other terms) may have different contributions (or importance) to the final prediction score, which can be determined by training the binary class models 475 using artificial intelligence model training.

Further, steps 805-815 can repeat sequentially and/or run in parallel for each product. Based on the number of classes each product supports, scores assigned to the respective classes, and scores assigned to individual features (e.g., support features), the data relevance engine 160 can assign an overall score to each product. For example, the score can for each product can be a sum of the scores assigned to each the classes found, and support levels determined, for that product.

At step 820, for each identified product, the data relevance engine 460 can add to a data table data indicating the product and a support level of the product with regard to the at least one class.

At step 825, the data relevance engine 460 can generate and output a product features map 1100 based on the data indicating the products and a support level of each product with regard to the at least one class.

Figure 11:
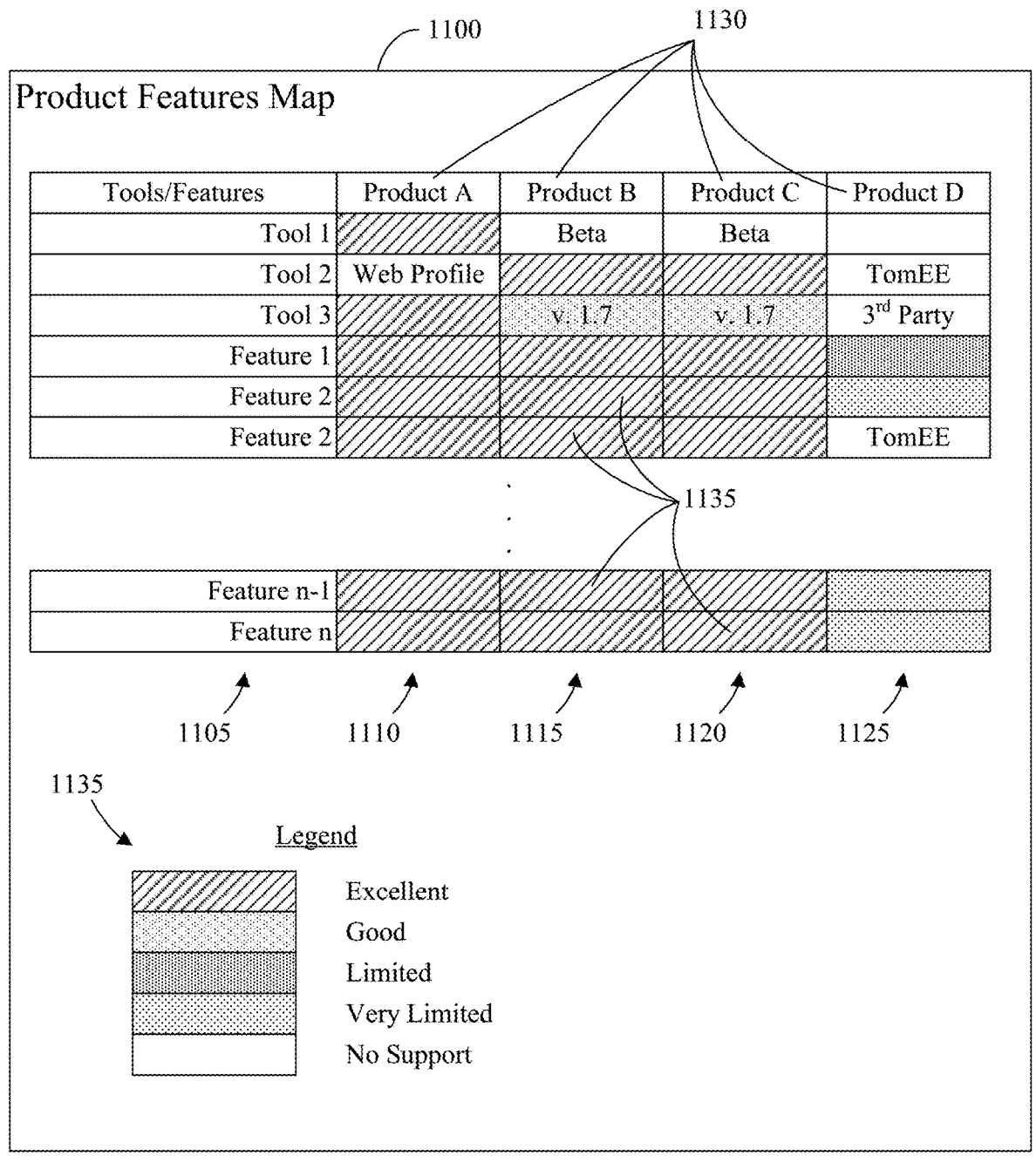
FIG. 11 depicts an example product features map according to an embodiment of the present invention.

FIG. 11 depicts an example product features map 1100 according to an embodiment of the present invention. The product features map 1100 can present a comparison of products, including tools, features, and indications of how the products score with regard to support for the tools and features.

By way of example, the product features map 1100 can include a column 1105 indicating tools and features supported by the tools. The tools can correspond to the previously described classes, and the features can correspond to the previously described features of those classes. The product features map 1100 can include a respective column 1110, 1115, 1120, 1125 for each of the products 1130 being compared. Each column 1110-1125 can include a respective cell 1135 for each tool/feature of column 1105. Each cell 1135 can indicate a level of the product's support for that tool/feature. For example, the cells 1135 can be color coded to indicate the support level. Optionally, the one or more of the cells 1135 also may include text providing information/context related to the support level. The product features map 110 also can include a legend 1140 explaining the indications presented in the cells.

By reviewing the product features map 1100, a user can quickly and easily compare multiple products to one another. In this regard, the user can determine from the product features map 1100 which products best suits the user's needs. Moreover, since the product features map presents results of data gathered from across multiple content sources, the information presented to the user is much more thorough as compared to a mere product data sheet. In this regard, product data sheets typically lack enough information related to tool and feature support to enable a user to make a sufficiently informed decision. The present arrangements overcome such limitations.

The foregoing description is just an example of embodiments of the invention, and variations and substitutions. While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   identifying first content for products;
   for each identified first content, predicting, using a processor, at least one class to which the first content pertains using an artificial intelligence multiclass model;
   for each identified first content that corresponds to the at least one class, predicting a support level of the product with regard to at least one class using artificial intelligence binary class models;
   for each identified product, adding to a data table data indicating the product and the support level of the product with regard to the at least one class; and
   generating and outputting a product features map based on the data indicating the products and a support level of each product with regard to the at least one class.

2. The method of claim 1, wherein the identifying the first content for the products comprises:
   receiving at least one user input indicating web pages for the products;
   responsive to the receiving the at least one user input indicating the web pages for the products, accessing first content from the web pages; and
   for each product, automatically searching, using a web crawler, an Internet for additional web sites comprising first content pertaining to that product.

3. The method of claim 1, further comprising:
   collecting terms from websites;
   collecting and tagging second content for use as training material in training models for the collected terms;
   training the artificial intelligence multiclass model to predict classes to which the terms belong; and
   training the artificial intelligence binary class models to predict support levels for the terms.

4. The method of claim 3, wherein the collecting the terms from the web sites comprises:
   automatically searching an Internet for second content using a web crawler; and
   downloading and indexing the second content from the websites in real time.

5. The method of claim 3, wherein the training the artificial intelligence multiclass model to predict the classes to which the terms belong comprises:
   for each term, randomly selecting from the second content a portion of the second content;
   for each term and for each of the second content, analyzing that second content to determine whether that second content includes the particular term;
   for each term and for each of the second content, generating a label indicating whether that second content includes the particular term;
   for each term and for each of the second content, extracting features from that second content and communicating the extracted features to a machine learning algorithm; and
   the machine learning algorithm updating the artificial intelligence multiclass model to indicate for the term to indicate that the extracted features are relevant to the term.

6. The method of claim 5, further comprising:
   the machine learning algorithm determining trending data pertaining to usage of the terms among the content using support vector machines; and
   the machine learning algorithm determining classes for the terms based on the trending data.

7. The method of claim 1, wherein the product features map presents a comparison of the products, the comparison of the products indicating tools, features, and how the products score with regard to support for the tools and features.

8. A system, comprising:
   a processor programmed to initiate executable operations comprising:
   identifying first content for products;
   for each identified first content, predicting at least one class to which the first content pertains using an artificial intelligence multiclass model;
   for each identified first content that corresponds to the at least one class, predicting a support level of the product with regard to at least one the at least one class using artificial intelligence binary class models;
   for each identified product, adding to a data table data indicating the product and a support level of the product with regard to the at least one class; and
   generating and outputting a product features map based on the data indicating the products and a support level of each product with regard to the at least one class.

9. The system of claim 8, wherein the identifying the first content for the products comprises:
   receiving at least one user input indicating web pages for the products;
   responsive to the receiving the at least one user input indicating the web pages for the products, accessing first content from the web pages; and
   for each product, automatically searching, using a web crawler, an Internet for additional web sites comprising first content pertaining to that product.

10. The system of claim 8, further comprising:
    collecting terms from websites;
    collecting and tagging second content for use as training material in training models for the collected terms;
    training the artificial intelligence multiclass model to predict classes to which the terms belong; and
    training the artificial intelligence binary class models to predict support levels for the terms.

11. The system of claim 10, wherein the collecting the terms from the websites comprises:
    automatically searching an Internet for second content using a web crawler; and
    downloading and indexing the second content from the websites in real time.

12. The system of claim 10, wherein the training the artificial intelligence multiclass model to predict the classes to which the terms belong comprises:
    for each term, randomly selecting from the second content a portion of the second content;

for each term and for each of the second content, analyzing that second content to determine whether that second content includes the particular term;

for each term and for each of the second content, generating a label indicating whether that second content includes the particular term;

for each term and for each of the second content, extracting features from that second content and communicating the extracted features to a machine learning algorithm; and the machine learning algorithm updating the artificial intelligence multiclass model to indicate for the term to indicate that the extracted features are relevant to the term.

13. The system of claim 12, further comprising:

the machine learning algorithm determining trending data pertaining to usage of the terms among the content using support vector machines; and the machine learning algorithm determining classes for the terms based on the trending data.

14. The system of claim 8, wherein the product features map presents a comparison of the products, the comparison of the products indicating tools, features, and how the products score with regard to support for the tools and features.

15. A computer program product, comprising:

one or more computer readable storage mediums having program code stored thereon, the program code stored on the one or more computer readable storage mediums collectively executable by a data processing system to initiate operations including:

a processor programmed to initiate executable operations comprising:

identifying first content for products;

for each identified first content, predicting at least one class to which the first content pertains using an artificial intelligence multiclass model;

for each identified first content that corresponds to the at least one class, predicting a support level of the product with regard to the at least one class using artificial intelligence binary class models;

for each identified product, adding to a data table data indicating the product and a support level of the product with regard to the at least one class; and generating and outputting a product features map based on the data indicating the products and a support level of each product with regard to the at least one class.

16. The computer program product of claim 15, wherein the identifying the first content for the products comprises:

receiving at least one user input indicating web pages for the products;

responsive to the receiving the at least one user input indicating the web pages for the products, accessing first content from the web pages; and for each product, automatically searching, using a web crawler, an Internet for additional web sites comprising first content pertaining to that product.

17. The computer program product of claim 15, wherein the program code is executable by the data processing system to initiate operations further comprising:

collecting terms from websites;

collecting and tagging second content for use as training material in training models for the collected terms;

training the artificial intelligence multiclass model to predict classes to which the terms belong; and training the artificial intelligence binary class models to predict support levels for the terms.

18. The computer program product of claim 17, wherein the collecting the terms from the websites comprises:

automatically searching an Internet for second content using a web crawler; and downloading and indexing the second content from the websites in real time.

19. The computer program product of claim 15, wherein the training the artificial intelligence multiclass model to predict the classes to which the terms belong comprises:

for each term, randomly selecting from the second content a portion of the second content;

for each term and for each of the second content, analyzing that second content to determine whether that second content includes the particular term;

for each term and for each of the second content, generating a label indicating whether that second content includes the particular term;

for each term and for each of the second content, extracting features from that second content and communicating the extracted features to a machine learning algorithm; and the machine learning algorithm updating the artificial intelligence multiclass model to indicate for the term to indicate that the extracted features are relevant to the term.

20. The computer program product of claim 19, wherein the program code is executable by the data processing system to initiate operations further comprising:

the machine learning algorithm determining trending data pertaining to usage of the terms among the content using support vector machines; and the machine learning algorithm determining classes for the terms based on the trending data.

* * * * *